United States Patent
Valeri et al.

(10) Patent No.: US 9,510,067 B2
(45) Date of Patent: *Nov. 29, 2016

(54) SELF-DIAGNOSTIC NON-BUSSED CONTROL MODULE

(71) Applicant: GM GLOBAL TECHNOLOGY OPERATIONS LLC, Detroit, MI (US)

(72) Inventors: Frank C. Valeri, Novi, MI (US); Scott M. Reilly, Davisburg, MI (US); Pawel W. Sleboda, Bloomfield Hills, MI (US); Ian R. Singer, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 594 days.

This patent is subject to a terminal disclaimer.

(21) Appl. No.: 13/654,848

(22) Filed: Oct. 18, 2012

(65) Prior Publication Data

US 2014/0115392 A1   Apr. 24, 2014

(51) Int. Cl.
*G06F 11/27* (2006.01)
*H04Q 9/00* (2006.01)
*G08C 23/02* (2006.01)

(52) U.S. Cl.
CPC ............... *H04Q 9/00* (2013.01); *G08C 23/02* (2013.01); *H04Q 2209/86* (2013.01)

(58) Field of Classification Search
USPC ........................................................ 702/185
See application file for complete search history.

(56) References Cited

U.S. PATENT DOCUMENTS

| | | | |
|---|---|---|---|
| 8,713,404 B2 | 4/2014 | Fai et al. | |
| 2007/0025559 A1 | 2/2007 | Mihelich et al. | |
| 2008/0020807 A1 | 1/2008 | Kolano et al. | |
| 2008/0226101 A1 | 9/2008 | Silber et al. | |
| 2009/0082879 A1* | 3/2009 | Dooley | B25J 9/1658 700/3 |
| 2009/0134890 A1 | 5/2009 | Johnson | |
| 2009/0164060 A1 | 6/2009 | Fortson et al. | |
| 2010/0290643 A1 | 11/2010 | Mihelich et al. | |
| 2011/0064232 A1 | 3/2011 | Ruwisch | |
| 2011/0116642 A1 | 5/2011 | Hall et al. | |
| 2011/0133953 A1 | 6/2011 | Nagatomo | |
| 2012/0041638 A1 | 2/2012 | Johnson et al. | |
| 2012/0174111 A1 | 7/2012 | Pala et al. | |
| 2012/0215754 A1 | 8/2012 | Marzani et al. | |
| 2013/0076506 A1 | 3/2013 | Smith et al. | |
| 2015/0100200 A1* | 4/2015 | Singer et al. | 701/33.1 |

FOREIGN PATENT DOCUMENTS

| | | |
|---|---|---|
| CN | 1756444 A | 4/2006 |
| CN | 1959352 A | 5/2007 |
| JP | 2001257751 A | 9/2001 |

OTHER PUBLICATIONS

Motrorola Inc. communicator sector, Tone remote control module, Apr. 10, 1987, 26 pages.*
http://searchstorage.techtarget.com/definition/bus, 1 page, printed Apr. 27, 2015.*
Chinese Office Action issued Mar. 9, 2015 in corresponding Chinese Application No. 201310590576.3.

* cited by examiner

*Primary Examiner* — Tung Lau
(74) *Attorney, Agent, or Firm* — Cantor Colburn LLP

(57) ABSTRACT

A non-bussed control module that receives an audio code is provided. The non-bussed control module includes a tone processing module, a self-diagnostic module, and a reporting module. The tone processing module receives the audio code, and sends a trigger signal if the audio code is received. The self-diagnostic module performs a self-diagnostic test for the non-bussed control module if the trigger signal is received, and generates a diagnostic signal indicative of the self-diagnostic test. The reporting module receives the diagnostic signal and determines a type of fault based on the diagnostic signal.

20 Claims, 1 Drawing Sheet

SELF-DIAGNOSTIC NON-BUSSED CONTROL MODULE

FIELD OF THE INVENTION

Exemplary embodiments of the invention relate to a non-bussed control module that is not connected to a communication bus and, more particularly, to a non-bussed control module that performs a self-diagnostic test.

BACKGROUND

A vehicle communication bus allows for various control modules within a vehicle to communicate with one another. For example, a controller area network ("CAN") network is a vehicle bus standard that allows control modules to communicate with one other within a vehicle without a host computer.

As a result, if a specific control module is not connected to the vehicle communication bus (sometimes referred to as a non-bussed control module), then the non-bussed control module is unable to receive instructions or commands from an external source (e.g., to initiate a self-diagnostic mode). Thus, in one approach to initiate a self-diagnostic mode, the non-bussed control module is removed from the vehicle in order to receive instructions or commands, which may be time-consuming and inconvenient. In another approach, an input/output (I/O) line may be attached to the non-bussed control module, where commands are sent through the I/O line to initiate the self-diagnostic mode. In yet another approach, a jumper harness may be connected from a laptop or other portable computer to the non-bussed control module to send commands and initiate the self-diagnostic mode. Alternatively, in another embodiment, a light sensor may be added to the non-bussed control module to receive and read light pulses. In yet another embodiment, a radio frequency ("RF") receiver may be added to the non-bussed control module for receiving RF commands to initiate the self-diagnostic mode. However, each of these approaches generally add cost and complexity to the non-bussed control module. Accordingly, it is desirable to provide a cost-effective, relatively simple approach for allowing a control module that is not connected to a vehicle communication bus to receive instructions or commands.

SUMMARY OF THE INVENTION

In one exemplary embodiment of the invention, a non-bussed control module that receives an audio code is provided. The non-bussed control module includes a tone processing module, a self-diagnostic module, and a reporting module. The tone processing module receives the audio code, and sends a trigger signal if the audio code is received. The self-diagnostic module performs a self-diagnostic test for the non-bussed control module if the trigger signal is received, and generates a diagnostic signal indicative of the self-diagnostic test. The reporting module receives the diagnostic signal and determines a type of fault based on the diagnostic signal.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
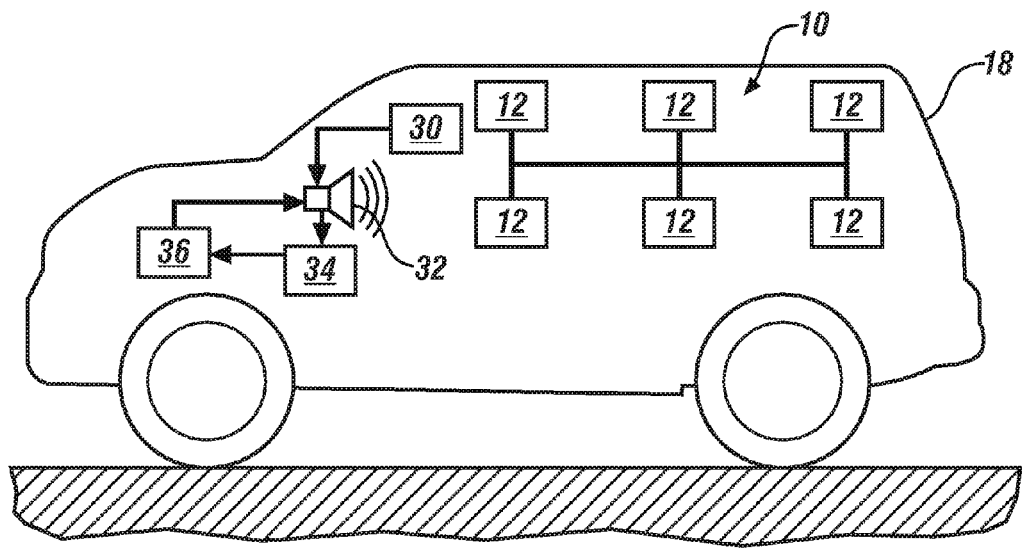
FIG. 1 is an exemplary schematic illustration of a non-bussed control module in a vehicle.

Referring now to FIG. 1, an exemplary embodiment is directed to a vehicle communication bus 10 that interconnects a plurality of control modules 12 with one another within a vehicle 18. The vehicle communication bus 10 may be, for example, a media oriented systems transport ("MOST") network, a local area network ("LAN"), or a controller area network ("CAN"). The vehicle 18 also includes a radio or audio module 30, one or more speakers 32, a microphone 34, and a non-bussed control module 36. In the embodiment as shown, the non-bussed control module 36 is not connected to the vehicle communication bus 10, and is therefore unable to receive instructions or commands from one of the control modules 12. The audio module 30 may be in communication with the speaker 32. The microphone 34 may be in communication with the non-bussed control module 36. The non-bussed control module 36 is in communication with the speaker 32.

Figure 2:
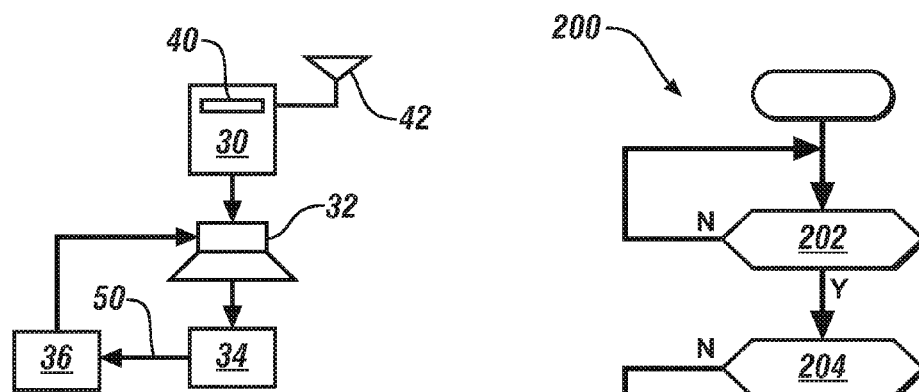
FIG. 2 is an exemplary schematic illustration of an audio module, a speaker, a microphone, and the non-bussed control module shown in FIG. 1.

Turning now to FIG. 2, the audio module 30 may include an audio device 40 for playing media or digital files such as, for example, a compact disk ("CD") player or an MPEG Audio Layer III ("MP3") player. In one embodiment, a CD or audio file is played by the audio device 40, and the audio module 30 transmits an audio signal to the speaker 32. In another embodiment, the audio module 30 may receive data containing the audio signal through an external source (not shown) such as, for example, a smartphone or by a personal media player. Specifically, the audio module 30 may receive data by either a wired connection such as, for example, a universal serial bus ("USB") connection. Alternatively, in another approach the audio module 30 may receive data from the external source by a wireless connection though an antenna 42 (e.g., a Bluetooth® connection).

The audio signal is then transmitted over the speaker 32 as an audible tone. In one embodiment, the audio device 40 plays an audio code. The audio code is a specific sequence of audible tones containing diagnostic triggering information. Specifically, the audio codes are configured to trigger or induce the non-bussed control module 36 into performing a self-diagnostic test, which is described in greater detail below. It should be noted that while the audio module 30 and the speaker 32 are shown, in an alternative embodiment the audio signal may be provided by a source external to the vehicle 18. For example, in an alternative embodiment the audio code may be provided by a speaker located in a smartphone, a portable radio, an end-of-line tester typically found in a vehicle assembly plant, or a vehicle diagnostic device.

In one embodiment, the audio code is transmitted over the speaker 32 as an audible tone, and is picked up by the microphone 34. In one exemplary embodiment, the microphone 34 may be an active noise cancelling ("ANC") microphone for reducing the amount of unwanted background noise, and the non-bussed control module 36 may be an ANC control module. The audio code is then transmitted from the microphone 34 to the non-bussed control module 36 through an input 50. In the embodiment as shown in FIG. 2, the input 50 is a microphone input. In an alternative embodiment, the microphone 34 may be omitted. In this embodiment, the non-bussed control module 36 is in direct communication with the speaker 32, and the input 50 is an audio input line. Specifically, the input 50 (e.g., the audio input line) of the non-bussed control module 36 is directly connected to the audio module 30. The non-bussed control module 36 determines if the audio code is present on the input 50 (e.g., the audio input line).

Figure 3:
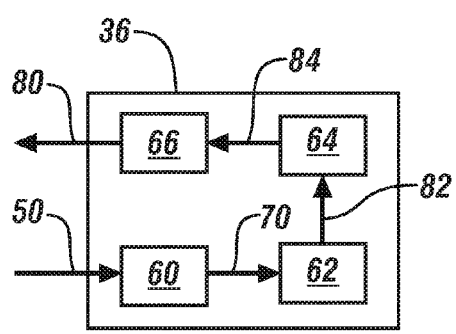
FIG. 3 is a dataflow diagram of the non-bussed control module shown in FIG. 1.

Referring now to FIG. 3, a dataflow diagram illustrates an exemplary embodiment of the non-bussed control module 36 of FIGS. 1-2. In various embodiments, the non-bussed control module 36 may include one or more sub-modules and datastores. In the exemplary embodiment as shown in FIG. 3, the non-bussed control module 36 includes a tone processing module 60, a self-diagnostic module 62, a reporting module 64, and an audio output module 66.

The tone processing module 60 receives the audio code through the input 50 (where the input 50 may be either a microphone input or an audio line input). The tone processing module 60 continuously monitors the input 50 for the audio code. In the event the audio code is received, the audio code triggers or induces the tone processing module 60 to produce an activation or trigger signal 70. The trigger signal 70 indicates that the audio code has been received by the tone processing module 60. The trigger signal 70 is sent to the self-diagnostic module 62.

In one embodiment, the tone processing module 60 may require a preconditioning event to occur before receiving the audio code. The preconditioning event indicates that a specific required event has occurred. For example, the prerequisite event may be a key-on or ignition-on event of the vehicle 18, a door of the vehicle 18 (not shown) being closed, or the non-bussed control module 36 receiving electrical power. Specifically, for example, electrical power may be provided to the non-bussed control module 36 (e.g., during an ignition-on event), which indicates that the preconditioning event (e.g., powering the non-bussed control module 36) has occurred. Once the non-bussed control module 36 receives electrical power, the tone processing module 60 then monitors the input 50 for a predetermined amount of time for the audio code. In one embodiment, the predetermined amount of time may be about 15 seconds, however it is to be understood that other amounts of time may be used as well. Also, the predetermined amount of time may be calibrated. In the event the audio tone is received within the predetermined amount of time, then the tone processing module 60 produces the trigger signal 70.

In one embodiment, the tone processing module 60 receives the audio code through the input 50 as an indication that the preconditioning event has occurred. The audio code may be generated by the audio module 30 (e.g., someone plays the audio code using the audio device 40) and is transmitted through the speaker 32 in response to the preconditioning event occurring (e.g., ignition-on event of the vehicle 18 or a door of the vehicle 18 being closed). After receiving the audio code once, the tone processing module 60 may continue to monitor the input 50 for the predetermined amount of time for the audio code to be sent again. That is, the audio code is sent twice, once to establish that the preconditioning event has occurred, and again to induce the tone processing module 60 to produce the trigger signal 70. However, the audio code need not be played twice. Instead, the tone processing module 60 is preconditioned to search for the audio code each time the non-bussed control module 36 is powered.

Upon receipt of the trigger signal 70 from the tone processing module 60, the self-diagnostic module 62 may then perform a self-diagnostic test for the non-bussed control module 36. Specifically, the self-diagnostic test may poll various devices located within the non-bussed control module 36 such as, for example, the input 50, a speaker audio output 80, various connections, microphone polarity, and microphone levels. The self-diagnostic module 62 then generates a diagnostic signal 82 that is indicative of the results of the self-diagnostic test. The diagnostic signal 82 is then sent to the reporting module 64.

The reporting module 64 receives the diagnostic signal 82 from the self-diagnostic module 62, and determines if any devices located within the non-bussed control module 36 are not functioning correctly based on the diagnostic signal 82. The reporting module 64 may determine a specific fault, if any, based on the diagnostic signal 82, as well as the type of fault (e.g., a fault with the input 50, the audio output 80, etc.). If one or more faults have occurred, then the reporting module 64 creates an audio output 84. The audio output 84 indicates the type of fault that has occurred in the non-bussed control module 36. The audio output 84 may be any type of audio file format such as, for example, a waveform audio file format ("WAV"). The audio output 84 may be any type of sound that would provide an indication of the specific fault that has occurred within the non-bussed control module 36. In one exemplary embodiment the audio output 84 may be a sequence of tones, or a voice indictor. Specifically, for example, the voice indicator may be a male or female voice dictating the specific fault within the non-bussed control module 36. In another example, a sequence of tones having varying length is provided, where the length, number, or frequency of the tones may indicate the specific fault within the non-bussed control module 36.

The audio output 84 is sent to the audio output module 66. The audio output module 66 amplifies the audio output 84 to create the speaker audio output 80 that is sent to the speaker 32 (shown in FIGS. 1-2). The speaker audio output 80 is configured to drive the speaker 32 (shown in FIGS. 1-2). The audio output module 66 may include, for example, various integrated circuits (ICs) for amplifying the audio output 84 into the speaker audio output 80.

Referring now to FIGS. 1-3, the speaker audio output 80 is then transmitted over the speaker 32 as an audio tone, and may be heard by an occupant in the vehicle 18 (or an individual situated proximate to the vehicle 18 as well). The individual may then be able to determine the type of fault that has occurred in the non-bussed control module 36 based on the audio tone transmitted by the speaker 32. Thus, the non-bussed control module 36 may perform the self-diagnostic test without communicating with the vehicle communication bus 10, and may also transmit the results of the self-diagnostic test over the speaker 32, without the need for connectivity to the vehicle communication bus 10. The approach as discussed above does not require the non-bussed control module 36 to be removed from the vehicle 18 in order to perform the self-diagnostic test. Moreover, the approach as discussed above also does not require the non-bussed control module 36 to be assessed by removing trim panels (not shown). The approach as discussed above also does not require a wired remote connection to the non-bussed control module 36.

Figure 4:
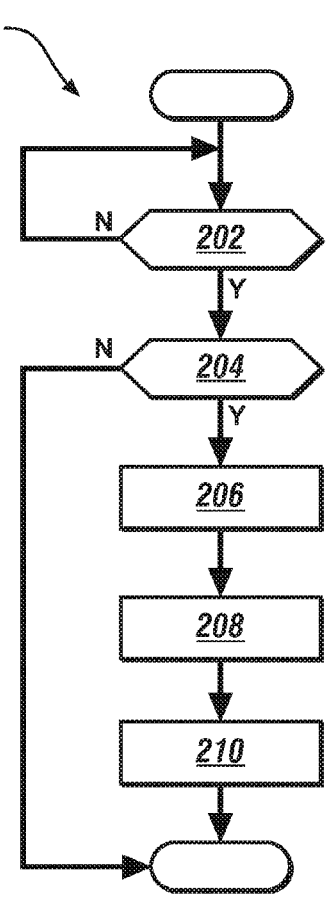
FIG. 4. is a process flow diagram illustrating a method of initiating a self-diagnostic mode in the non-bussed control module.

Turning now to FIG. 4, a method 200 of initiating a self-diagnostic mode in the non-bussed control module 36 is illustrated. Referring generally to FIGS. 1-4, method 200 begins at step 202, where the tone processing module 60 of the non-bussed control module 36 determines if the preconditioning event has occurred. In one embodiment, the preconditioning event may be electrical power being provided to the non-bussed control module 36. In another embodiment, the preconditioning event may be the audio code being received through the input 50. The tone processing module 60 may proceed to step 204 once the preconditioning event has occurred.

In step 204, the tone processing module 60 monitors the input 50 for the audio code. The tone processing module 60 monitors the input 50 for the predetermined amount of time, and if the tone processing module 60 receives the audio code, then the tone processing module 60 produces the trigger signal 70. Method 200 may then proceed to step 206. In the event the audio code is not received, then method 200 may terminate.

In step 206, the self-diagnostic module 62 performs the self-diagnostic test for the non-bussed control module 36. The self-diagnostic module 62 then generates the diagnostic signal 82 indicative of the results of the self-diagnostic test. The diagnostic signal 82 is then sent to the reporting module 64. Method 200 may then proceed to step 208.

In step 208, the reporting module 64 receives the diagnostic signal 82 and determines a specific fault, if any, based on the diagnostic signal 82, as well as the type of fault. If one or more faults have occurred, then the reporting module 64 creates the audio output 84. The audio output 84 indicates the type of fault that has occurred in the non-bussed control module 36. The audio output 84 is then sent to the audio output module 66. Method 200 may then proceed to step 210.

In step 210, the audio output module 66 amplifies the audio output 84, and creates the speaker audio output 80. The audio output 84 is amplified into the speaker audio output 80, and is sent to the speaker 32. The speaker audio output 80 is configured to drive the speaker 32 (shown in FIGS. 1-2). The speaker audio output 80 is then transmitted over the speaker 32 as an audio tone. Method 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A non-bussed control module that receives an audio code, comprising:
    a tone processing module, implemented as non-bussed hardware in a vehicle, for receiving the audio code and sending a trigger signal if the audio code is received;
    a self-diagnostic module, implemented as non-bussed hardware in the vehicle, for performing a self-diagnostic test for the non-bussed control module if the trigger signal is received, and generating a diagnostic signal indicative of the self-diagnostic test; and
    a reporting module, implemented as non-bussed hardware in the vehicle, for receiving the diagnostic signal and determining a type of fault based on the diagnostic signal.

2. The non-bussed control module of claim 1, wherein the reporting module creates an audio output based on the type of fault.

3. The non-bussed control module of claim 2, wherein the audio output is one of a tone sequence and a voice file that indicates the status of the non-bussed control module.

4. The non-bussed control module of claim 2, comprising an output module that receives the audio output from the reporting module and amplifies the audio output.

5. The non-bussed control module of claim 1, wherein the tone processing module requires a preconditioning event to occur before receiving the audio code.

6. The non-bussed control module of claim 5, wherein the preconditioning event is one of an ignition-on event, and the non-bussed control module being powered.

7. The non-bussed control module of claim 1, wherein the audio code is a specific sequence of audible tones containing diagnostic triggering information configured to induce the self-diagnostic module of the non-bussed control module into performing the self-diagnostic test.

8. The non-bussed control module of claim 1, wherein the non-bussed control module includes an input that is one of a microphone input and an audio input line.

9. A vehicle including a vehicle communication bus that interconnects a plurality of control modules with one another, the vehicle comprising:
    a non-bussed control module, implemented as non-bussed hardware in the vehicle, that receives an audio code, the non-bussed control module unconnected to the vehicle communication bus, the non-bussed control module comprising:
    a tone processing module, implemented as non-bussed hardware in the vehicle, for receiving the audio code, and sending a trigger signal if the audio code is received;
    a self-diagnostic module, implemented as non-bussed hardware in the vehicle, for performing a self-diagnostic test for the non-bussed control module if the trigger signal is received, and generating a diagnostic signal indicative of the self-diagnostic test; and
    a reporting module, implemented as non-bussed hardware in the vehicle, for receiving the diagnostic signal and determining a type of fault based on the diagnostic signal.

10. The vehicle of claim 9, wherein the reporting module creates an audio output based on the type of fault.

11. The vehicle of claim 10, wherein the audio output is one of a tone sequence and a voice file that indicates the status of the non-bussed control module.

12. The vehicle of claim 10, wherein the non-bussed control module comprises an output module that receives the audio output from the reporting module and amplifies the audio output.

13. The vehicle of claim 9, wherein the tone processing module requires a preconditioning event to occur before receiving the audio code.

14. The vehicle of claim 13, wherein the preconditioning event is one of an ignition-on event, and the non-bussed control module being powered.

15. The vehicle of claim 9, wherein the audio output is generated by a speaker located in the vehicle.

16. The vehicle of claim 9, wherein the audio output is generated by one of a speaker located in a smartphone, a portable radio, an end-of-line tester, and a vehicle diagnostic device.

17. A method of initiating a self-diagnostic test in a non-bussed control module, comprising:
- receiving an audio code by a tone processing module implemented as non-bussed hardware in a vehicle, the tone processing module sending a trigger signal if the audio code is received;
- performing a self-diagnostic test for the non-bussed control module if the trigger signal is received by a self-diagnostic module;
- generating a diagnostic signal indicative of the self-diagnostic test; and
- receiving the diagnostic signal by a reporting module implemented as non-bussed hardware in the vehicle, the reporting module determining a type of fault based on the diagnostic signal.

18. The method of claim 17, comprising creating an audio output based on the type of fault by the reporting module.

19. The method of claim 17, comprising receiving the audio output by an output module and amplifying the audio output by the output module.

20. The method of claim 17, comprising requiring a preconditioning event to occur before receiving the audio code by the tone processing module.

* * * * *